United States Patent

[11] 3,548,899

[72] Inventor Christopher P. Emerson
 Lamoni, Iowa 50650
[21] Appl. No. 735,081
[22] Filed June 6, 1968
[45] Patented Dec. 22, 1970

[54] TREE FELLING DEVICE
 3 Claims, 10 Drawing Figs.
[52] U.S. Cl. ................................................. 144/309,
 144/34; 254/133
[51] Int. Cl. ............................................. A01g 23/08
[50] Field of Search ................................... 144/34,
 342(1—6), 309(34); 254/133, 93, 1(Inquired)

[56] References Cited
UNITED STATES PATENTS
2,707,615  5/1955  Green........................... 254/100

| | | | |
|---|---|---|---|
| 2,960,309 | 11/1960 | Swanson...................... | 254/133 |
| 3,014,696 | 12/1961 | Trott........................... | 254/93 |
| 3,219,075 | 11/1965 | Roberts et al................ | 144/34 |

Primary Examiner—Gerald A. Dost
Attorney—Henderson and Strom

ABSTRACT: This invention relates to a tree felling device and process for controlling the direction of fall of a tree, the device comprising a pair of thrust blocks secured to the side of a tree opposite the desired direction of fall, one thrust block being secured below the line of severance, the second thrust block being secured above the line of severance and a hydraulic jack interconnecting the blocks, the jack expandable longitudinally in a direction substantially parallel to the side of the tree to tip the tree toward the desired direction of fall.

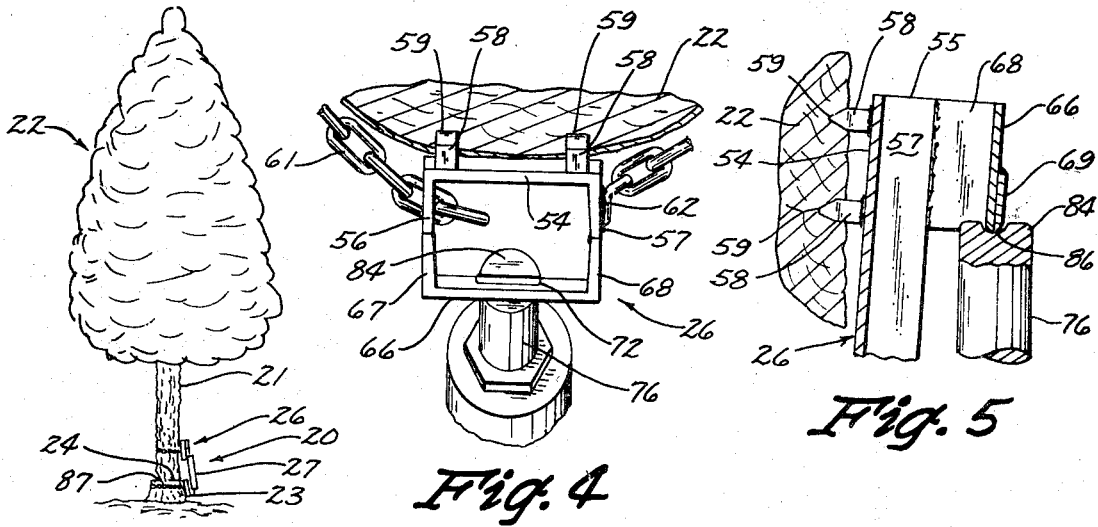
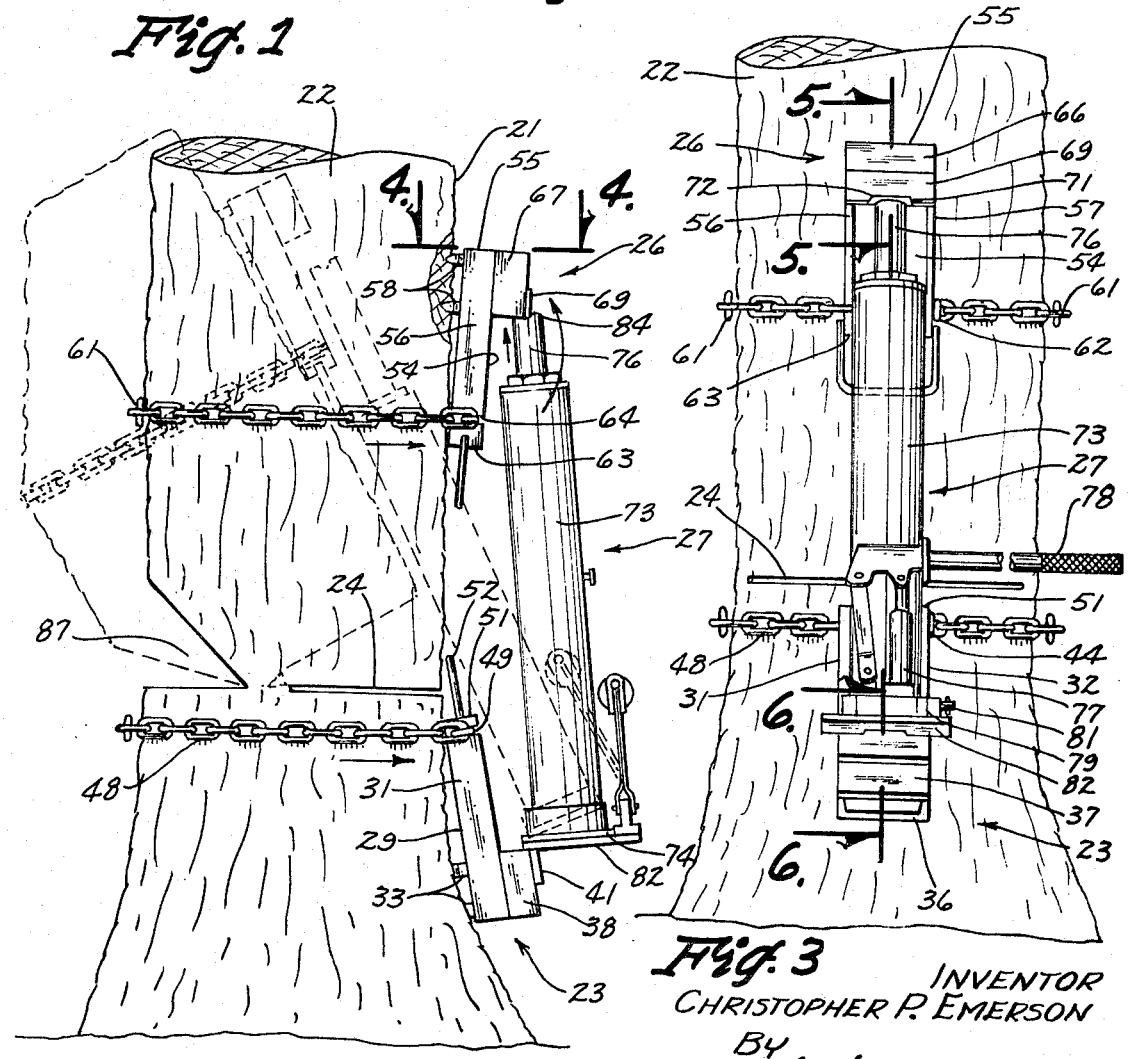

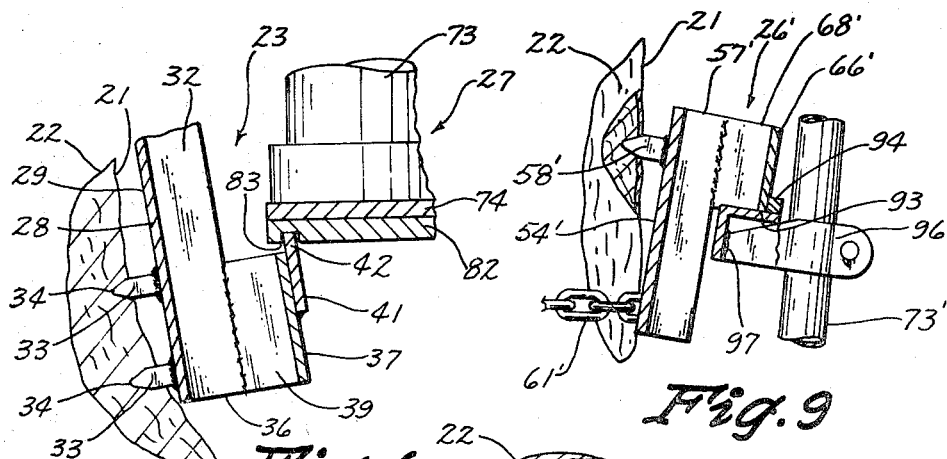
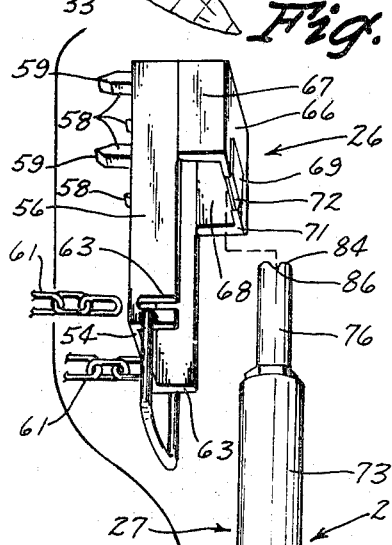
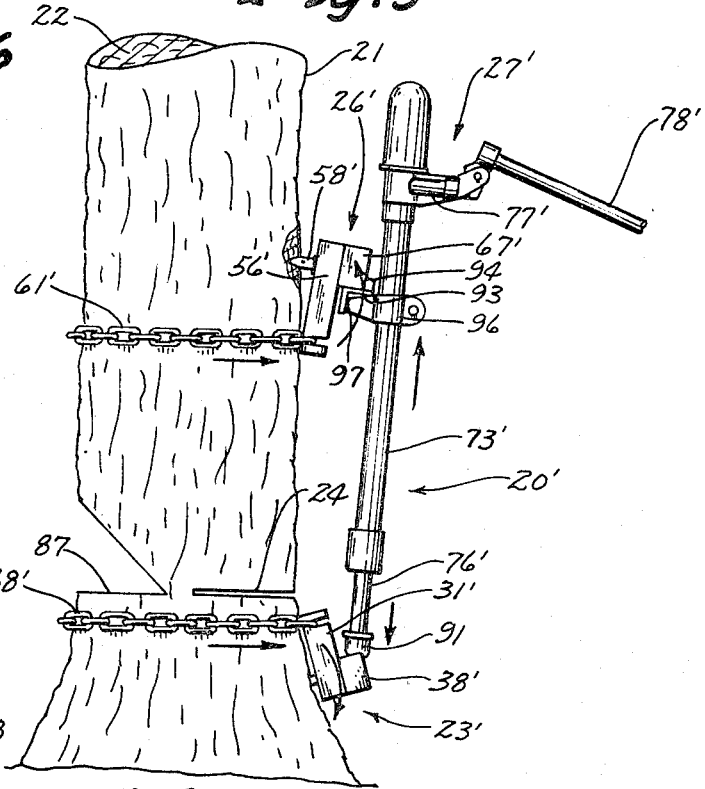
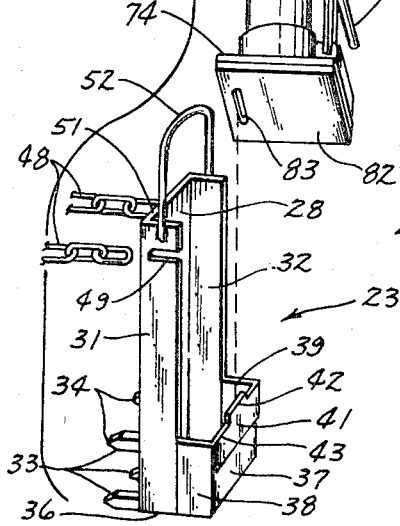
Fig. 6  Fig. 7  Fig. 8  Fig. 9  Fig. 10
INVENTOR
CHRISTOPHER P. EMERSON
BY
Henderson & Strom
ATTORNEYS

TREE FELLING DEVICE

BACKGROUND OF THE INVENTION

This invention relates generally to the cutting of trees and timber, and particularly to a tree felling jack device to apply thrust to a tree to tip the tree in the desired direction of fall.

It is the practice in today's lumbering industry to be selective when choosing which trees in a forest are to be felled and which trees are to left, rather than to simply clear the forest of all trees. Care must be taken to insure that the selected tree falls accurately in the desired direction of fall, or injury to adjacent trees may occur, or access to the felled tree with a skid may not be possible because of the trees growing adjacent to the selected tree.

Quite often it is impossible to fell the tree in the desired direction without applying mechanical force because the tree may be leaning in an opposite direction because of heavier branch growth on one side, or because of a prevailing wind opposing the desired direction of fall. An added problem encountered under these conditions is that the tree may settle back on the saw and lock it in the saw cut, thereby causing damage to the saw.

In order to alleviate these problems, other jacks have been proposed, as for example those illustrated in U.S. Pat. Nos. 2,583,945 and 2,960,309 showing the jack anchored to the ground surrounding the base of the tree, and as illustrated in U.S. Pat. No. 3,014,696 showing the jack anchored to the tree. The problem encountered with these jacks is that often trees adjacent to the tree to be felled are less than 2 feet away, making it sometimes impossible to find a suitable anchor spot. Also, the device in U.S. Pat. No. 3,014,696, because of its anchoring arrangement, may pivot due to its extended chain connection should the wind change and tip the tree away from the desired direction of fall. The present invention will overcome all of these problems.

SUMMARY OF THE INVENTION

This invention relates to a tree felling jack device comprising an elongated thrust block securely attached to the side of a tree, and which is positioned on the tree opposite the desired direction of fall and below the line of severance; a second elongated thrust block securely attached to the side of the tree opposite the desired direction of fall and above the line of severance; and a hydraulic jack means connecting the thrust blocks, the jack means capable of exerting pressure to the blocks when extended longitudinally and substantially parallel to the axis of the tree causing the distance between the blocks to increase and thereby tilting the partially severed tree trunk away from the stump toward the side of the tree opposite the device.

It is an object of this invention to provide an improved tree felling device.

It is another object of this invention to provide a device which will tip a tree accurately toward its eventual direction of fall, the direction of fall being predetermined by the operator of the device.

It is yet another object of this invention to provide a device that is capable of tipping a tree, wherein the device securely attaches to the tree such that slippage and pivoting of the device is avoided.

It is still another object of this invention to provide a device for tipping a tree which is capable of producing sufficient thrust to tip a tree while requiring but a small area lateral to the tree for attachment and operation.

It is a further object of this invention to provide a tree tipping device which is portable, compact, and does not require any tools for attachment or detachment from the tree.

It is still a further object of this invention to provide a device for tipping a tree which is capable of fulfilling all the above objects yet is simple, economical, and rugged in construction.

These objects, and other features and advantages of this invention will become readily apparent upon reference to the following description when taken in conjunction with the following drawings.

BRIEF DESCRIPTION OF THE DRAWINGS

FIG. 1 is a side elevational view of the device of this invention attached to the trunk of a tree to be felled;

FIG. 2 is an enlarged side elevational view of the device attached to the trunk of a tree;

FIG. 3 is a front elevational view of the device of FIG. 2;

FIG. 4 is a plan view as taken along the line 4—4 of FIG. 2;

FIG. 5 is a further enlarged cross-sectional view as taken along the line 5—5 of FIG. 3;

FIG. 6 is a further enlarged cross-sectional view as taken along the line 6—6 of FIG. 3;

FIG. 7 is an exploded perspective view of the device of this invention;

FIG. 8 is a side elevational view showing a modification of the device of this invention attached to the side of a tree;

FIG. 9 is an enlarged side elevational view of the modification showing the top thrust block connecting the jack; and FIG. 10 is an enlarged side elevational view of the modification showing the bottom thrust block attached to the tree and connected to the jack.

DESCRIPTION OF THE PREFERRED EMBODIMENT

Referring now to the drawings, and particularly FIG. 1, a tree felling jack is indicated generally at 20, and is showing in assembled relation attached to the side 21 of a tree 22 to be felled. Generally, the tree felling jack 20 comprises a first thrust block 23 engaging the side 21 of the tree 22 below the cut line or line of severance 24, a second thrust block 26 engaging the side 21 of the tree 22 above the line of severance 24, and a hydraulic jack 27 substantially parallel to the longitudinal axis of the tree 22, serving as a power means pivotally connecting the thrust blocks 23, 26.

The lower thrust block 23 (FIGS. 2 and 7) includes an elongated, U-shaped channel member comprising a substantially flat member 28 adapted to engage the side 21 of the tree 22 and a pair of parallel side members 31, 32 integral with the member 28 and angled away from the tree 22 in operating position. A plurality of projections 33 adapted to penetrate the side 21 (FIG. 6) of the tree 22 to prevent the thrust plate 23 from slipping in operation are attached, as by welding, to the surface 29 (FIG. 6) of the flat plate 28 nearest the side 21 of the tree 22. The projections 33 are attached to the surface 29 of the plate 28 nearest the bottom edge 36 of the thrust block 23. The tips 34 of the projections 33 are blunt and it has been found that the blunt tips 34 will penetrate the tree 22 sufficiently to prevent slippage, but will not imbed so deeply that manual removal is possible to disengage the thrust block 23 subsequent to the felling of the tree 22.

A mounting member 37 having a pair of sides 38, 39 attaching as by welding, to the sides 31, 32, respectively, in the lower edge 36 of the thrust block 23 is adapted to receive the hydraulic jack 27. A reinforcement plate 41 (FIGS. 6 and 7) is attached to the mounting member 37. The reinforcement plate 41 is provided with a tab 42 projecting upward from its top surface 43 to prevent lateral movement of the hydraulic jack 27 as hereinafter described.

To secure the lower thrust block 23 snugly to the side 21 of the tree 22, a tie chain 48 is provided. One end 44 (FIG. 3) of the tie chain 48 is attached, as by welding, to the side 32 of the thrust block 23 near the upper edge 51 of the thrust block 23. The chain 48 encircles the tree 22 and is selectively fastened to the side 31 of the thrust block 23 by a slot 49 therein provided (FIGS. 2 and 7). An upwardly extending U-shaped rod 52 attaches the sides 31, 32 to form a handle for transporting the thrust block 23.

The upper thrust block 26 is an inverted version of the lower thrust block 23 and comprises an elongated channel member having a flat plate 54 (FIGS. 2—5) and a pair of substantially parallel sides 56, 57 integral with the flat plate 54 and angled away from the tree 22 when the thrust block is in secured position. The flat plate 54 is adapted to engage the side 21 of the tree 22 and is provided with a plurality of projections 58 having blunt tips 59 attached thereto for penetrating the tree 22 when pressure from the hydraulic jack 27 is exerted upon the block 26.

To secure the thrust block 26 to the tree 22, a link chain 61 is attached, as by welding, at one end 62 to the side 57 of the thrust block 26 near the lower edge 63 of the thrust block 26. The chain 61 is adapted to encircle the tree 22 and is selectively secured to the side 56 of the thrust block by an appropriate slot 64 therein provided, thereby snugly engaging the thrust block 26 against the tree 22.

A mounting member 66 having sides 67, 68 is attached, as by welding, to the sides 56, 57, respectively, of the thrust block 26 lateral to the attached projections 58. A reinforcement plate 69 is attached to the mounting member 66 to receive the hydraulic jack 27. The reinforcement plate 69 has a bottom surface 71 which is notched 72 thereby preventing lateral movement of the connected hydraulic jack 27.

The hydraulic jack is an ordinary, commercially available hydraulic jack comprising a hydraulic cylinder 73 (FIG. 3) to the lower end of which a base plate 74 is attached. A piston rod 76 is reciprocally contained in the jack cylinder 73 and is extendable upon the application of hydraulic pressure medium to the inner or mounting end of the cylinder and retracts with the release of pressure. The hydraulic jack 27 also is equipped with a hand pump 77 of the usual kind, having a handle 78 operable to force the employed fluid pressure medium into the lower end of the jack cylinder, thus to extend the piston rod 76. A check valve 79 is incorporated in the jack 27 to hold the pressure in the cylinder 73 and this valve has a manual adjustment means 81 to release the pressure medium for return from the cylinder 73 to its storage reservoir in the pump 77.

Attached to the base 74 of the hydraulic jack 27 is a base plate 82 having a slot 83 formed therein. The slot 83 is adapted to set over the tab 42 of the lower thrust block 23, and thereby prevent lateral movement or slippage of the hydraulic jack 27 from the mounting member 37 and reinforcement plate 41. The outer end 84 of the piston rod 76 is provided with a groove 86 to receive the mounting plate 66 and reinforcement plate 69 of the thrust block 26. The end 84 of the piston rod 76 sets within the notch 72 formed in the lower surface 71 of the reinforcement plate. The groove 86 together with the notch 72 provide an attachment of the hydraulic cylinder 27 to the upper thrust block 26 that is void of lateral movement, while pivoting of the block 26 about the rod 76 is not affected.

The device 20 is applied to the tree as follows: First the lower thrust block 23 is attached to the side of the tree opposite the desired direction of fall by a chain 48. The chain 48 and thrust block 23 are positioned below the line of severance defined by a saw cut 24 and the usual wedge-shaped notch 87 previously formed in the tree 22. The hydraulic jack 27 (FIG. 6) is placed upon the mounting plate 37 and reinforcement plate 41, making certain that the tab 42 is within the slot 83 of the base plate 82. The upper thrust block 26 (FIG. 5) is positioned within the groove 86 formed on top 84 of the piston rod 76 and contiguous to the side 21 of the tree 22. When the mounting plate 66 and reinforcement plate 69 are within the provided groove 86 of the piston rod 76 and the end 84 of the piston rod 76 is within the notch 72 of the mounting plate 66 and reinforcement plate 69, the upper thrust block 26 is snugly secured to the side 21 of the tree 22 by the chain 61 secured to the sides 56 and 57 of the thrust block 26.

With the hydraulic jack 27 in place and the thrust blocks 23, 26 secured to the side of the tree, pressure is applied by pumping fluid into the hydraulic cylinder 73. The saw cut 24 is then continued, and as it progresses, the piston rod 76 is extended accordingly. The extension of the piston rod 76 exerts pressure against the vertically secured thrust blocks 23, 26 and extending the distance therebetween, thereby creating a thrust against the side 21 of the tree 22 effecting a tipping and falling of the tree in the desired direction directly opposite the direction of thrust application by the thrust blocks 23, 26. When the saw cut 24 is sufficiently deep, the tree will fall, leaving the stump in the ground, as illustrated by the broken lines in FIG. 2.

As the tree falls, the hydraulic jack 27 breaks away from the thrust block 26 and remains leaning against the lower thrust block 23, again as illustrated by the broken lines in FIG. 2.

A modification of a tree felling device is illustrated in FIGS. 8, 9 and 10 and is indicated generally by the numeral 20'. The device 20' includes a pair of thrust blocks 23', 26' attached to the side 21 of a tree 22 on opposite sides of a cut line 24 and connected by a modified conventional hydraulic jack 27'.

The lower thrust block 23' of the device 20' includes a tree engaging plate 28' (FIG. 10), having a plurality of projections 33' attached thereto for engaging the side 21 of a tree 22. The block 23' is secured to the tree 22 by a chain 48' encircling the tree 22, the chain 48' being selectively fastened to the sides 31', 32' of the thrust block 23'.

A mounting member 37' having a pair of sides 38', 39' attaching to the sides 31', 32' respectively, of the block 23' extends laterally away from the tree 22 in secured position and attaches an upwardly extending cupped receptacle 91 having a flanged opening 92 for receiving the downwardly extending end 84' of the piston rod 76'.

The upper thrust block 26' (FIG. 9) includes a tree engaging plate 54' having side members 56', 57' and a plurality of projections 58' attached to the plate 54' engaging the side 21 of a tree 22. The upper thrust block 26' is attached to the tree 22 by a chain 61' as hereinbefore described.

The mounting member 66' is a flat plate having flanged sides 67', 68' attaching the sides 56', 57' respectively of the thrust block 26'. The bottom edge 93 of the member 66' is flat and adapted to rest upon a Z-shaped member 94 attached to a laterally projecting bracket 96 fastened to the casing of the hydraulic jack cylinder 73' as hereinafter described.

The hydraulic jack 27' is a commercially available jack having the usual hydraulic cylinder 73', piston rod 76', hand pump 77' and handle 78' together with a pressure check valve (not shown). Basically, the jack 27' differs from the more conventional jack 27 (FIG. 3) in that it is void of a base 74 and therefore attaches to an item, here illustrated as the upper thrust block 26' (FIG. 8) by a bracket 96 secured to the casing of the hydraulic cylinder 73'. To accommodate the device 20', a substantially Z-shaped member 94 is attached at the end 97 of the bracket 96 to engage the underedge 93 of the mounting member 66'.

In all respects, the modified device 20' performs the identical functions as hereinbefore defined, but is adapted for use with smaller trees.

From the hereinbefore given description, it is apparent that the tree felling device provides tree engaging members 23, 26 which securely attach to the side 21 of a tree 22 without the problem of slippage while providing a chain 48, 61 attachment which will adapt to any size tree, yet will snugly secure the thrust blocks 23, 26 to the tree providing the maximum leverage and the least amount of strain, therefore minimizing the chain 48, 61 snapping problem.

Although the preferred embodiment and a modification thereof have been shown and described hereinbefore, it is to be remembered that various other alternative constructions can be made thereto without departing from the true spirit and scope of the invention as defined in the appended claims.

I claim:

1. A device for tipping a tree which has had a line of severance formed in the trunk thereof, the device comprising:
   first means adapted to grip the trunk fastened to the trunk below the severance line;
   second means adapted to grip the trunk fastened to the trunk above the severance line;
   jack means axially extendable and contractable pivotally connected to and extended between said first and second means; and wherein said jack means has a cylinder the base of which has a grooved form therein, and wherein further said first means includes a plate received in said base groove, said cylinder being thereby rockable on said plate.

2. A device for tipping a tree as defined in claim 1, and wherein said jack means has a piston rod the upper end of which has a groove formed therein, and further wherein said second means includes a plate received in said rod end groove, said rod being pivotal thereby about said second means plate.

3. The process of controlling the direction of fall of a tree to be severed, comprising:
  notching the side of a tree closest to the desired direction of fall;
  sawing toward the notch from the opposite side of the tree and forming a line of severance thereby;
  attaching first thrust block securely to the side of the tree opposite the notch and below the line of severance;
  pivoting one end of a hydraulic jack against the first thrust block;
  pivotally placing a second thrust block on the opposite end of the hydraulic jack above the line of severance;
  attaching said second thrust block securely to the side of the tree opposite the notch; and
  pumping said hydraulic jack to force said thrust blocks apart from each other.